United States Patent
Zhong et al.

(10) Patent No.: US 12,493,392 B2
(45) Date of Patent: Dec. 9, 2025

(54) CONTENT DISPLAY METHOD AND APPARATUS, ELECTRONIC DEVICE, AND COMPUTER-READABLE STORAGE MEDIUM

(71) Applicant: BEIJING BYTEDANCE NETWORK TECHNOLOGY CO., LTD, Beijing (CN)

(72) Inventors: Ke Zhong, Beijing (CN); Wenjing Liu, Beijing (CN); Dongdong Zuo, Beijing (CN); Yingke Wang, Beijing (CN); Kun Chang, Beijing (CN); Sen Wang, Beijing (CN); Fuqiang Zhang, Beijing (CN); Fuwei Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/185,868

(22) Filed: Mar. 17, 2023

(65) Prior Publication Data
US 2023/0221828 A1     Jul. 13, 2023

Related U.S. Application Data

(63) Continuation of application No. PCT/CN2021/114423, filed on Aug. 25, 2021.

(30) Foreign Application Priority Data

Sep. 18, 2020  (CN) ......................... 202010987256.1

(51) Int. Cl.
*G06F 3/0481*     (2022.01)
*G06F 3/04842*     (2022.01)

(52) U.S. Cl.
CPC ........ *G06F 3/0481* (2013.01); *G06F 3/04842* (2013.01)

(58) Field of Classification Search
CPC .. G06F 3/0481; G06F 3/04842; G06F 3/0483; G06F 9/451
(Continued)

(56) References Cited

U.S. PATENT DOCUMENTS 10,104,427 B1 * 10/2018 Zabetian ............ H04N 21/8133
10,373,176 B1 * 8/2019 Wei .................. H04N 21/26233
(Continued)

FOREIGN PATENT DOCUMENTS

| CN | 103699298 A | 4/2014 |
| CN | 105872801 A | 8/2016 |

(Continued)

OTHER PUBLICATIONS

Bund2boro, 'China's Vibrant Livestreaming Sales—Is the rest of the world Missing Out?', https://www.youtube.com/watch?v=enKwJrC7qpU Published May 2020, time (Screen Shots 1-5) (Year: 2020).*

(Continued)

*Primary Examiner* — Daniel Samwel

(57) ABSTRACT

Provided are a content display method and apparatus, an electronic device, and a computer-readable storage medium. The content display method includes: displaying a first content and a first display region, in which the first display region has a first display state and a second display state, the first display state corresponding to a first state of a first object, and the second display state corresponding to a second state of the first object; and displaying, in response to detection of a trigger signal in the first display region, a second content relevant to the first object when the first display region is displayed in the first display state. A state (Continued)

of the first object is prompted by means of a display state of the first display region, and a content relevant to the first object is directly reached through the first display region. Thus, a problem of resource waste resulted from displaying the content relevant to the first object can be solved.

20 Claims, 9 Drawing Sheets

(58) Field of Classification Search
USPC .......................................................... 715/781
See application file for complete search history.

(56) References Cited

U.S. PATENT DOCUMENTS

| | | | | |
|---|---|---|---|---|
| 10,567,677 | B2* | 2/2020 | Hagisu | G06V 40/23 |
| 10,643,070 | B1 | 5/2020 | Lewis et al. | |
| 2004/0014518 | A1* | 1/2004 | Iwamoto | G07F 17/32 463/20 |
| 2008/0091778 | A1* | 4/2008 | Ivashin | G06Q 10/10 709/224 |
| 2009/0025032 | A1* | 1/2009 | Morita | H04N 21/482 725/39 |
| 2014/0129942 | A1* | 5/2014 | Rathod | H04N 21/44226 715/720 |
| 2015/0135070 | A1* | 5/2015 | You | H04N 21/4755 715/716 |
| 2016/0156957 | A1* | 6/2016 | Yun | H04N 21/4415 725/14 |
| 2020/0151517 | A1* | 5/2020 | Choi | G06F 16/9035 |
| 2020/0351224 | A1* | 11/2020 | Gale | G08B 21/22 |

FOREIGN PATENT DOCUMENTS

| | | |
|---|---|---|
| CN | 106131584 A | 11/2016 |
| CN | 108881979 A | 11/2018 |
| CN | 108881994 A | 11/2018 |
| CN | 109348239 A | 2/2019 |
| CN | 109618192 A | 4/2019 |
| CN | 111050202 A | 4/2020 |
| CN | 111273834 A | 6/2020 |
| CN | 112162682 A | 1/2021 |
| WO | 2014085539 A1 | 6/2014 |

OTHER PUBLICATIONS

Primal Video, 'Complete StreamYard Tutorial: How to Live Stream Like a Pro!', Published Aug. 23, 2020, https://www.youtube.com/watch?v=i9SIF9pID0Y (Year: 2020).*
Search Report issued Nov. 10, 2021 for PCT Application No. PCT/CN2021/114423, English translation, (7 pages).
Ji Mi Qing baby, I Don't Have a Livestreaming Icon on My Kuaishou App, Baidu Zhidao, search date: Oct. 25, 2021, URL:http://zhidao.baidu.com/question/691383233286068204.html?http_skip=1, Oct. 22, 2019 (4 pages).
Fia Wo Qu Ni, How to Watch Livestreaming Video on Kuaishou? Baidu Jingyan, search date: Oct. 25, 2021, URL: https://iingyan.baidu.com/article/4b52d7024ea30fbc5d774b7a.html, Aug. 19, 2019 (8 pages).
First Office Action dated Aug. 23, 2021 in CN Appl. No. 202010987256.1, English translation (21 pages).
Second Office Action dated May 7, 2022 in CN Appl. No. 202010987256.1, English translation (30 pages).
Rejection Decision issued Dec. 28, 2022 in CN Appl. No. 202010987256.1, English translation (17 pages).
How does Taobao find the following anchors? Where can i watch the following anchors of Taobao live broadcast?, https://www.kaitao.cn/article/20220307143004.htm, 2017 (8 pages).
Written Opinion for International Application No. PCT/CN2021/114423, mailed Nov. 10, 2021, 8 Pages.

* cited by examiner

US 12,493,392 B2

CONTENT DISPLAY METHOD AND APPARATUS, ELECTRONIC DEVICE, AND COMPUTER-READABLE STORAGE MEDIUM

PRIORITY INFORMATION

The present application is a continuation of International Patent Application No. PCT/CN2021/114423, filed on Aug. 25, 2021, which claims a priority to Chinese Patent Application No. 202010987256.1, entitled "CONTENT DISPLAY METHOD AND APPARATUS, ELECTRONIC DEVICE, AND COMPUTER-READABLE STORAGE MEDIUM" and filed with China National Intellectual Property Administration on Sep. 18, 2020, the entire disclosure of which is incorporated herein by reference.

FIELD

The present disclosure relates to the field of content display, and more particularly, to a content display method and apparatus, an electronic device, and a computer-readable storage medium.

BACKGROUND

With the rapid development of information technology, mobile internet technology has also advanced by leaps and bounds. The emergence of smart devices, the arrival of the 5-th Generation Mobile Communication Technology (5G) era, and applications of technologies such as big data, Artificial Intelligence (AI) and algorithms have all given electronic mobile devices wings to take off. In real life, social interaction is enriched thanks to these technologies, especially the emergence of smartphones. The smartphones, which have eliminated time and space limitations of daily interaction of people, are truly comprehensive handheld mobile devices integrating massive information, network audio-visual functions, and leisure and entertainment, thereby meeting people's needs for daily information and social interaction.

Currently, a variety of platforms offer video and live-streaming services. Video makers can upload their own videos or start a live stream to interact with other users. However, to watch a particular video maker's video or live stream, one needs to enter the video maker's homepage and select a corresponding video or live stream interface to watch corresponding content or a corresponding video, which is troublesome and resource-consuming, for a reason that sometimes multiple clicks and jumps are required to view the corresponding content.

SUMMARY

The SUMMARY is provided to present concepts in a brief form, which will be described in detail later in the section of DETAILED DESCRIPTION. The SUMMARY is neither intended to identify key or essential features of the claimed technical solutions, nor is it intended to limit the scope of the claimed technical solutions.

To solve the above technical problems, embodiments of the present disclosure provide the following technical solutions.

In a first aspect, a content display method is provided according to embodiments of the present disclosure. The content display method includes: displaying a first content and a first display region, in which the first display region has a first display state and a second display state, the first display state corresponding to a first state of a first object, and the second display state corresponding to a second state of the first object; and displaying, in response to detection of a trigger signal in the first display region, a second content relevant to the first object when the first display region is displayed in the first display state.

Further, the content display method further includes displaying, in response to the detection of the trigger signal in the first display region, a third content relevant to the first object when the first display region is displayed in the second display state.

Further, the first display region includes: a first identifier corresponding to the first display state; or a second identifier corresponding to the second display state.

Further, the first identifier and the second identifier are configured to indicate different jump components; or the first identifier and the second identifier are configured to indicate a same jump component, the first identifier being configured to indicate a first jump state of the jump component, and the second identifier being configured to indicate a second jump state of the jump component.

Further, the displaying the first display region in the first display state includes: displaying, in response to detection of an indication signal indicating that the first object is in the first state, the first display region in the first display state.

Further, the displaying the first display region in the second display state includes displaying, in response to detection of an indication signal indicating that the first object is in the second state, the first display region in the second display state.

Further, the displaying the first display region in the second display state includes displaying, in response to no detection of the indication signal indicating that the first object is in the first state, the first display region in the second display state.

Further, the first state of the first object corresponds to a state in which the second content is in an available state, and the second state of the first object corresponds to a state in which the second content is in an unavailable state.

Further, the content display method further includes displaying the first content and the first display region in response to a completion of displaying the second content.

Further, the second content is a real-time content relevant to the first object.

In a second aspect, a content display apparatus is provided according to embodiments of the present disclosure. The content display apparatus includes: a first display module configured to display a first content and a first display region, in which the first display region has a first display state and a second display state, the first display state corresponding to a first state of a first object, and the second display state corresponding to a second state of the first object; and a second display module configured to display, in response to detection of a trigger signal in the first display region, a second content relevant to the first object when the first display region is displayed in the first display state.

In a third aspect, an electronic device is provided according to embodiments of the present disclosure. The electronic device includes: at least one processor; and a memory in a communication connection with the at least one processor. The memory is configured to store instructions executable by the at least one processor. The instructions are executed by the at least one processor to cause the at least one processor to perform the method described in any implementation of the above first aspect.

In a fourth aspect, a non-transitory computer-readable storage medium is provided according to embodiments of the present disclosure. The non-transitory computer-readable storage medium is configured to store computer instructions. The computer instructions are configured to cause a computer to perform the method described in any implementation of the above first aspect.

According to the embodiments of the present disclosure, the content display method and apparatus, the electronic device, and the computer-readable storage medium are disclosed. The content display method includes: displaying the first content and the first display region, in which the first display region has the first display state and the second display state, the first display state corresponding to the first state of the first object, and the second display state corresponding to the second state of the first object; and displaying, in response to detection of the trigger signal in the first display region when the first display region is displayed in the first display state, the second content relevant to the first object. With the above method, the state of the first object is prompted by means of the display state of the first display region, and the content relevant to the first object is directly reached through the first display region, which solve a problem of resource waste resulted from the displaying content relevant to the first object.

The above description is only a summary of the technical solutions of the present disclosure. To understand technical means of the present disclosure more clearly, implementations can be made in accordance with the content of this specification. In order to clarify and explain the above and other objects, features, and advantages of the present disclosure, preferred embodiments are provided below, detailed description of which is made with reference to the accompanying drawings.

BRIEF DESCRIPTION OF THE DRAWINGS

The above and other features, advantages, and aspects of embodiments of the present disclosure will become more apparent in conjunction with the accompanying drawings and with reference to the following specific embodiments. Throughout the drawings, same or similar elements are denoted by same or similar reference numerals. It should be understood that the drawings are schematic, and elements and components are not necessarily drawn to scale.

DETAILED DESCRIPTION

Figure 1:
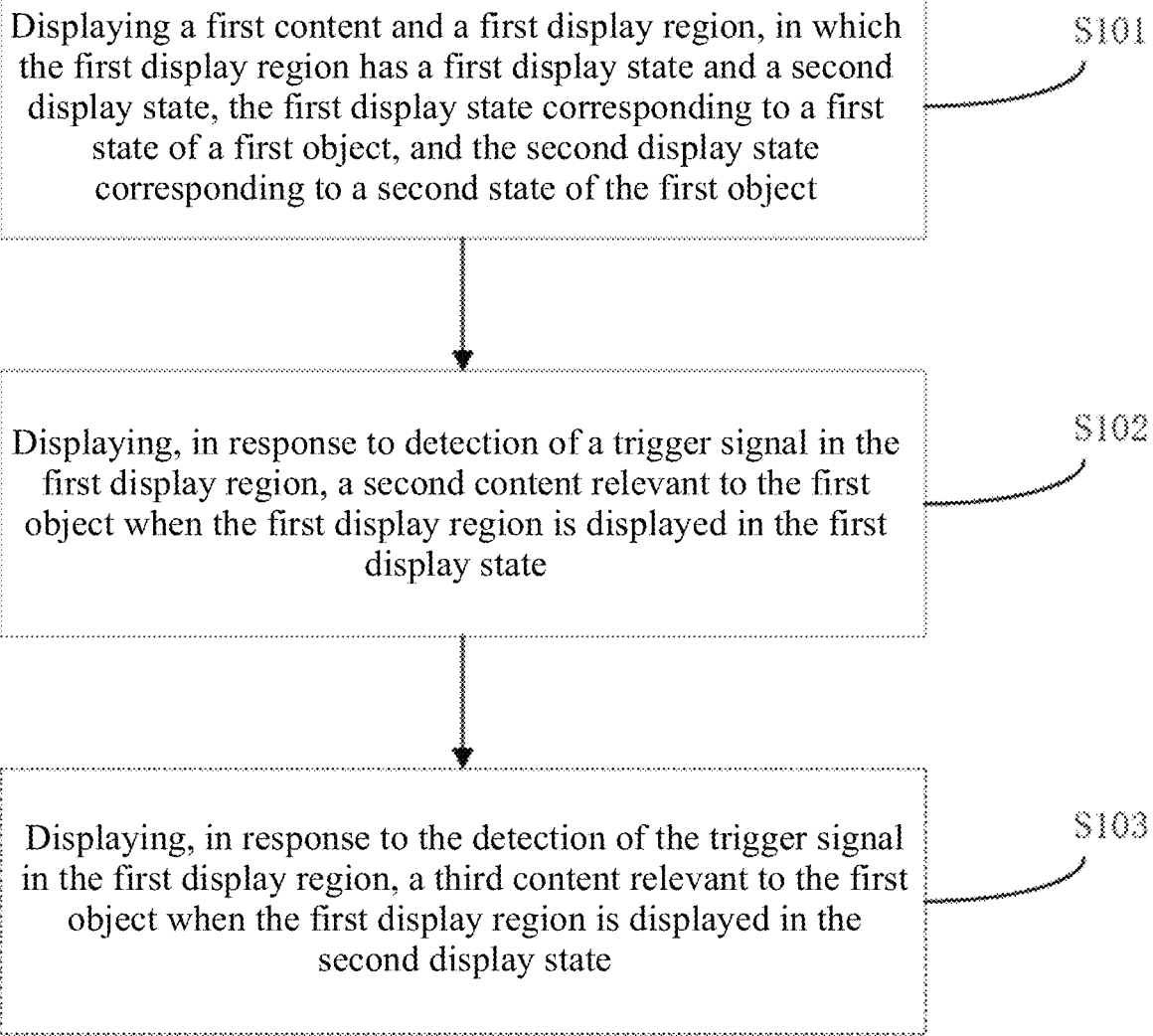
FIG. 1 is a schematic flowchart illustrating a content display method according to an embodiment of the present disclosure.

Embodiments of the present disclosure will be described in detail below with reference to the accompanying drawings. Although some embodiments of the present disclosure are illustrated in the drawings, it should be understood that the present disclosure may be embodied in various forms and should not be construed as being limited to the embodiments set forth herein. Instead, these embodiments are provided for a complete and thorough understanding of the present disclosure. It should be understood that the drawings and embodiments of the present disclosure are only used for exemplary purposes, rather than to limit the protection scope of the present disclosure.

It should be understood that steps described in the method embodiments of the present disclosure may be executed in different sequences and/or in parallel. In addition, method implementations may include additional steps and/or omit executions of the illustrated steps. The scope of the present disclosure is not limited in this respect.

The term "include" and its variants as used herein indicate open-ended inclusions, i.e., "includes but not limited to". The term "based on" refers to "at least partially based on". The term "one embodiment" means "at least one embodiment"; the term "another embodiment" means "at least one additional embodiment"; and the term "some embodiments" means "at least some embodiments". Related definitions of other terms will be given in the following description.

It should be noted that concepts such as "first" and "second" mentioned in the present disclosure are only used to distinguish different apparatuses, modules or units, rather than to limit a sequence or interdependence of functions performed by these apparatuses, modules or units.

It should be noted that modifications such as "a" and "plurality of" mentioned in the present disclosure are schematic instead of restrictive, and should be construed as "one or more" by those skilled in the art, unless otherwise clearly indicated in the context.

Names of messages or information exchanged between apparatuses in the embodiments of the present disclosure are only used for illustrative purposes, rather than limiting the scope of these messages or information.

Figure 6C:
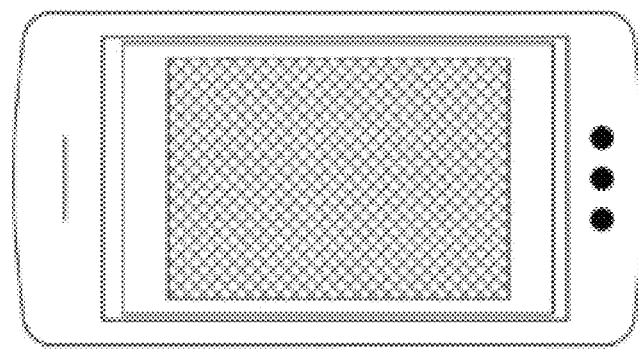
FIGS. 6a to 6c show three interfaces illustrating details on jumping from a video to a live-streaming room of Live streamer A.
Figure 6B:
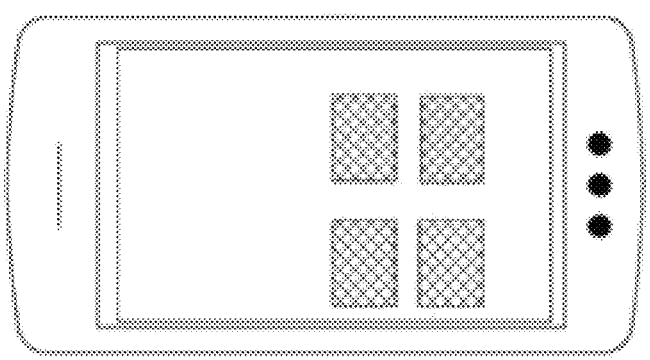
Figure 6A:
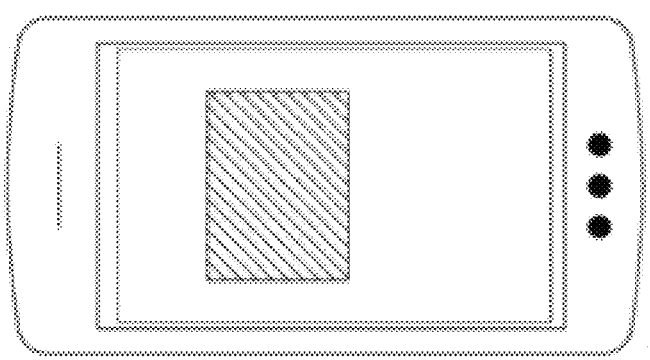

FIGS. 6a to 6c show three interfaces illustrating details on jumping from a video to a live-streaming room, in which the live-streaming room is used to provide a live stream of a live streamer and the video is related to the live stream of the live streamer. As shown in FIG. 6a, User B is watching video D. If User B is interested in the live stream A and wants to enter the live-streaming room of Live Streamer C in order to watch the live stream A, User B needs to jump to a homepage of Live Streamer C, as illustrated in FIG. 6b. Then, User B enters the live-streaming room of Live streamer C to watch the live stream A, as shown in FIG. 6c. For example, if User B wants to enter the live-streaming room of Live Streamer C when watching a video related to the live stream A, User B has to get to the homepage of Live Streamer C firstly, and then find the live-streaming room of Live Streamer C. The operations are cumbersome.

FIG. 1 is a flowchart illustrating a content display method according to an embodiment of the present disclosure. The content display method according to this embodiment may be performed by a content display apparatus. The content display apparatus may be implemented as software or as a combination of software and hardware, and may be integrated into a device in a content display system, such as a content display server or a content display terminal device. As illustrated in FIG. 1, the method includes actions at blocks S101 and S102.

At block S101, a first content and a first display region are displayed.

Figure 2A:
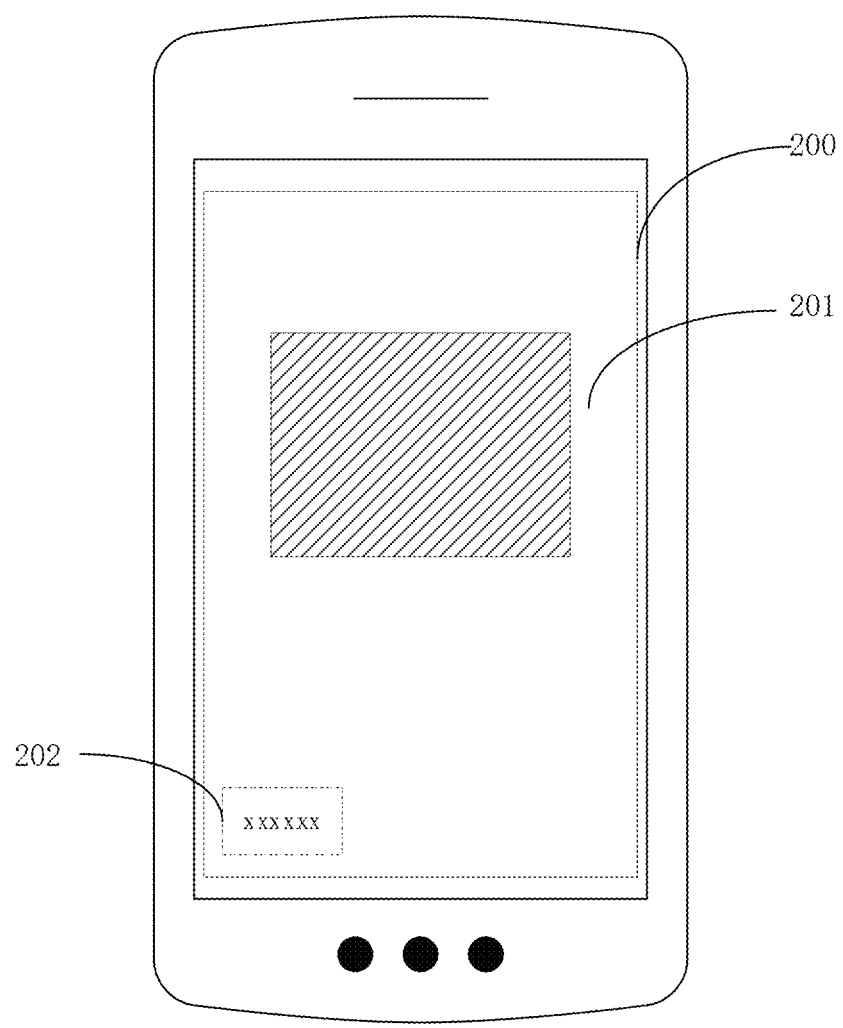
FIG. 2a to FIG. 2d each are a schematic diagram showing an example of a content display method according to an embodiment of the present disclosure.

Here, the first display region has a first display state and a second display state. The first display state corresponds to a first state of a first object. The second display state corresponds to a second state of the first object. In some embodiments, the first display region is located in a display page of the first content. In some embodiments, the first content is a video, an image, a text, etc., displayed in a first page; and the first display region is a display region in the first page and is configured to display relevant information of the first content, etc. FIG. 2a illustrates an example of displaying the first content and the first display region in a terminal device. As illustrated in FIG. 2a, a first content 201 is displayed in a first page 200, and a first display region 202 is located in the first page 200. The first content and the first display region may not overlap with each other (as illustrated in FIG. 2a), or may overlap with each other (not illustrated), and the present disclosure is not limited thereto.

The first display region has the first display state and the second display state. In some embodiments, the first display state and the second display state are states of the first display region itself. For example, the first display state indicates that the first display region is red, and the second display state indicates that the first display region is green, etc. For example, the first display state indicates that the first display region presents a dynamic special effect, and the second display state indicates that the first display region is displayed statically. In some embodiments, the first display state and the second display state are states of a content displayed in the first display region. For example, the first display state indicates that a content displayed in the first display region is red, and the second display state indicates that a content displayed in the first display region is green. For example, the first display state indicates that the content displayed in the first display region presents the dynamic special effect, the second display state indicates that the content in the first display region is displayed statically.

The first object is an object relevant to other contents. In some embodiments, the first object is relevant to a second content and a third content, in which case a state of the first object is relevant to availability of the second content and a third content; or the first object is relevant to the second content, in which case the state of the first object is relevant to availability of the second content.

In some embodiments, the first state of the first object corresponds to a state in which the second content is in an available state; and the second state of the first object corresponds to a state in which the third content is in an available state. The second content has a higher priority than the third content. That is, when both the second content and the third content are in the available state, the first state is set as the state of the first object. In some embodiments, the first state of the first object corresponds to a state in which the second content is in the available state; and the second state of the first object corresponds to a state in which the second content is in an unavailable state. That is, when the second content is in the available state, the first state is set as the state of the first object; and when the second content is in the unavailable state, the second state is set as the state of the first object.

In some embodiments, the second content is a real-time content relevant to the first object, such as a real-time video content. For example, the second content is a live-streaming video stream. The first object is a live streamer or a flag bit relevant to the live streamer, e.g., a flag bit relevant to whether the live streamer has started a live-streaming room, in which case the first state is a state in which a live stream is started, and the second state is a state in which the live stream is not started; or the first object is a room number of a live stream started by the live streamer, in which case the first state is a state in which the room number is not empty, and the second state is a state in which the room number is empty.

In the above embodiment, the first display state corresponds to the first state of the first object. That is, the first object is in the first state when the first display region is in the first display state. The first display state corresponds to the second display state of the first object. That is, the first object is in the second state when the first display region is in the second display state.

It should be understood that the above examples for the first content, the first display region, the first object, and the state of the first object are merely exemplary and do not constitute any limitation of the present disclosure.

At block 102, a second content relevant to the first object is displayed in response to detection of a trigger signal in the first display region when the first display region is displayed in the first display state.

Figure 2B:
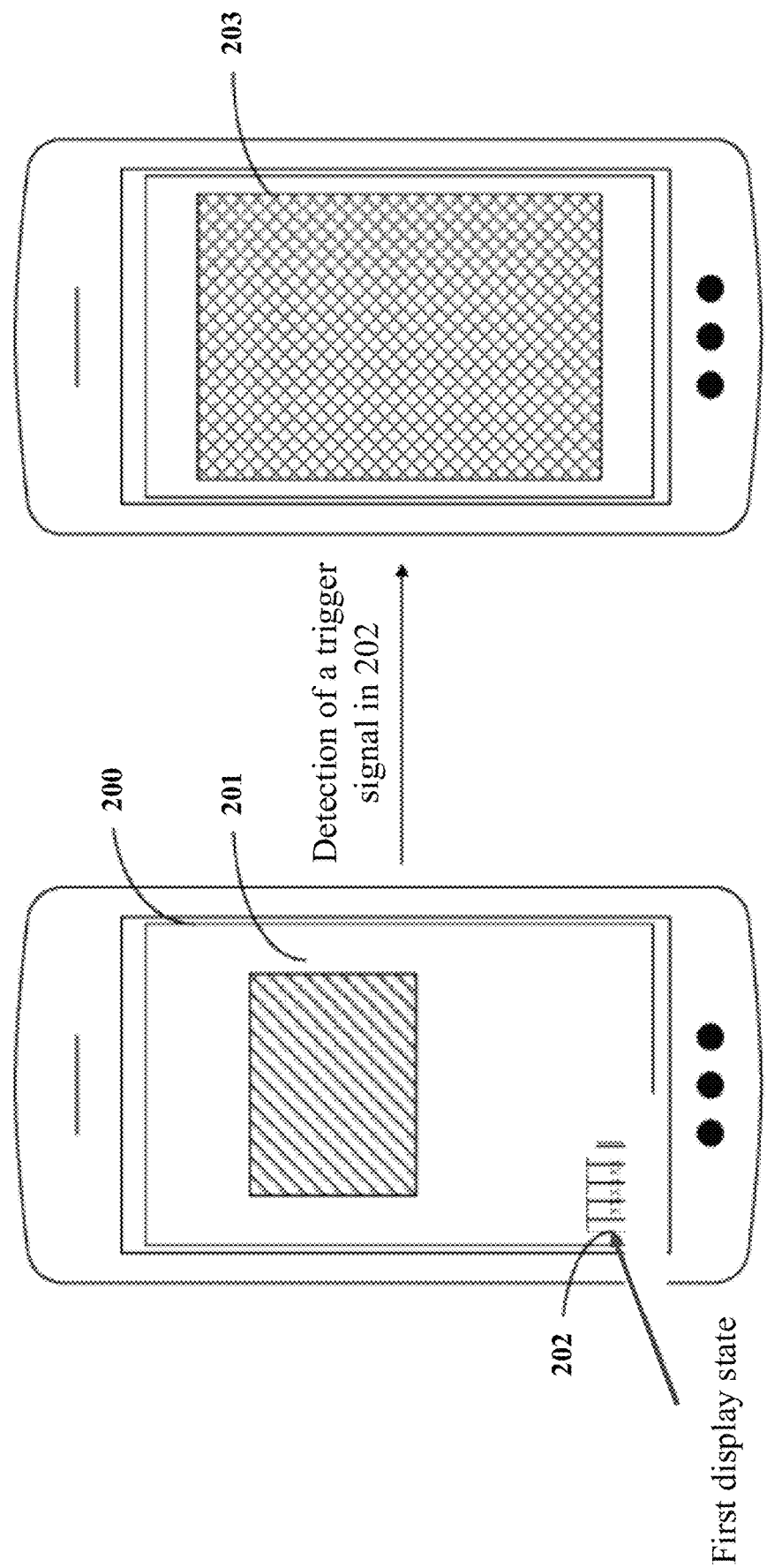

The first display region being displayed in the first display state indicates that the first object is in the first state. That is, the second content relevant to the first object is in the available state. In this case, the second content relevant to the first object is displayed in response to the detection of the trigger signal in the first display region. As illustrated in FIG. 2b, the first display region is displayed in the first display state, in which case it is indicated that the second content 203 is already in the available state. When the trigger signal, e.g., a signal generated by a click or a selection signal triggered by voice, etc., is detected in the first display region in this case, the second content is displayed on the terminal device. The second content may be displayed on the first page 200 or on another page presented by a jump. For example, the first display region is relevant to a live-streaming parameter of a first live streamer. When the first live streamer starts a live stream, the live-streaming parameter is in the first state, indicating that the first live streamer has started the live stream. Therefore, the first display region is in the first display state to prompt a user watching the first content that the first live streamer has started the live stream. When the user clicks on the first display region, the trigger signal is generated. Therefore, a live-streaming video of the first live streamer is displayed, and the user can watch the first live streamer's live-streaming video. As a non-limiting example, the second content is a live stream of a first live streamer, and the first content is a video related to the live stream. The first content and the second content are from different sources, i.e., corresponding to different users including a first user and a second user. The second content may be provided by the second user. When the second content is the live stream, the second user may be the first live streamer. The first content may be a video published by the first user onto the Internet. As such, according to the present disclosure, when a user is watching the video related to the live stream of the first live streamer, and gets interested in the live stream, the user may click on the first display region and then directly jump to the live streaming room of the live streamer to watch the live stream.

Figure 2C:
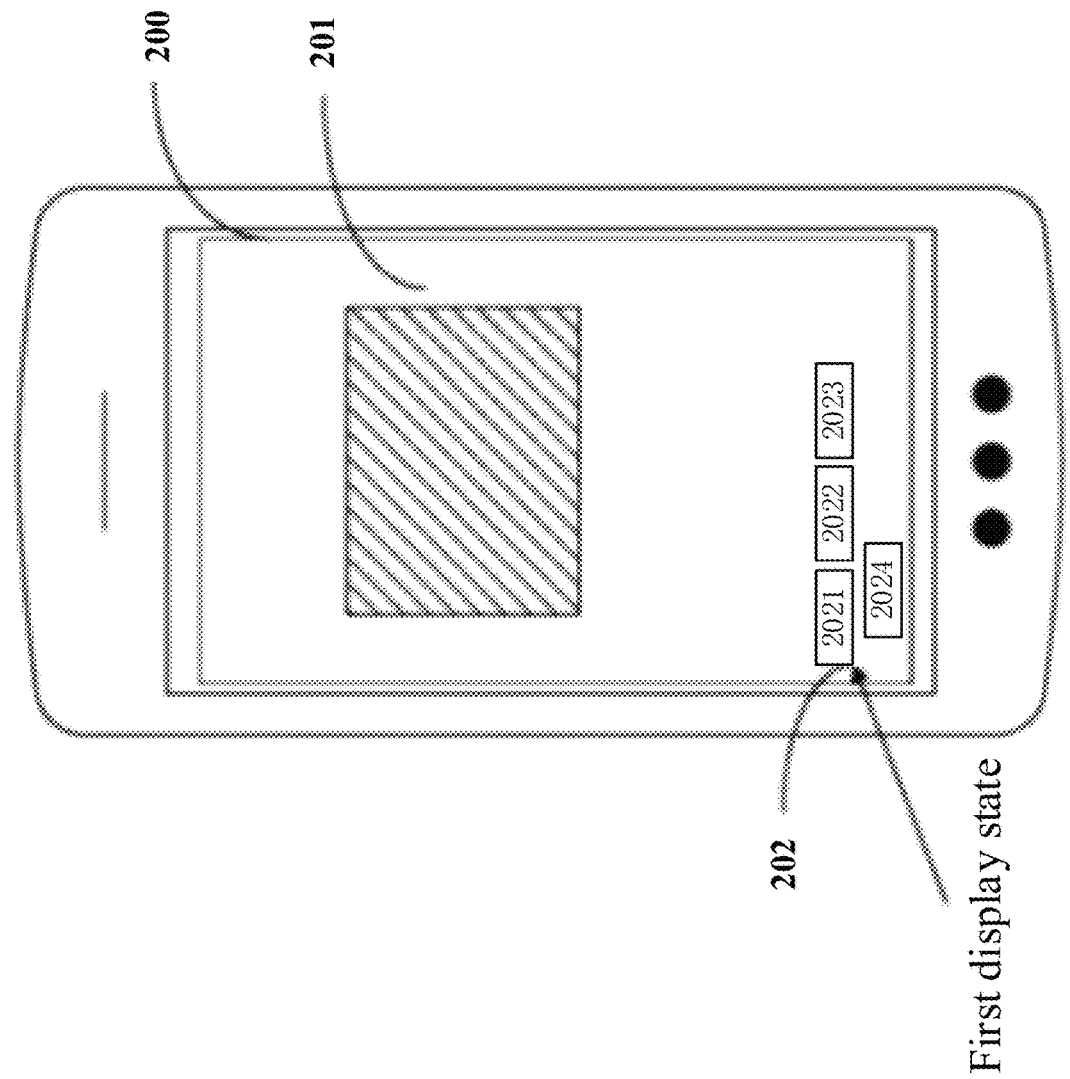

In some embodiments, in the first display state, the first display region 202 may include several display sub-regions. For example, as shown in FIG. 2c, the first display region may include four display sub-regions, i.e., a first display sub-region 2021, a second display sub-region 2022, a third display sub-region 2023, and a fourth display sub-region 2024. For example, a live-streaming entrance of the first live streamer may be displayed in the first display sub-region

2021. The live-streaming entrance may be an identification of the second content or an identification of the user corresponding to the second content. For example, when the second content is live stream, the identification of the second content may be an identification of the live-streaming room or an identification of the first live streamer. An association relationship between and the live stream and the first content 201 such as a video displayed on the first page 200 may be displayed in the second display sub-region 2022, and this association relationship for example indicates that the video displayed on the first page 200 is related to the live stream of the first live streamer. A live-streaming status identification such as a live-streaming icon may be displayed in the third display sub-region 2023, and indicates a status of the live stream, e.g., the first live streamer is live streaming. An identification of a publisher who published the video displayed on the first page 200 may be displayed on the fourth display sub-region 2024. It should be noted that the first display region 202 is not limited to include the four display sub-regions 2021, 2022, 2023 and 2024 as shown in FIG. 2c, and may include more or fewer than four display sub-regions. In addition, a layout of the display sub-regions of the first display region 202 is not limited to that shown in FIG. 2c, and the first display region 202 may also have other layouts of the display sub-regions, which also falls within the scope of the present disclosure. For example, an identification of the user corresponding to the first content 201 may be displayed on the display page of the first content.

Further, the content display method further includes an action at block S103.

At block S103, a third content relevant to the first object is displayed in response to the detection of the trigger signal in the first display region when the first display region is displayed in the second display state.

Figure 2D:
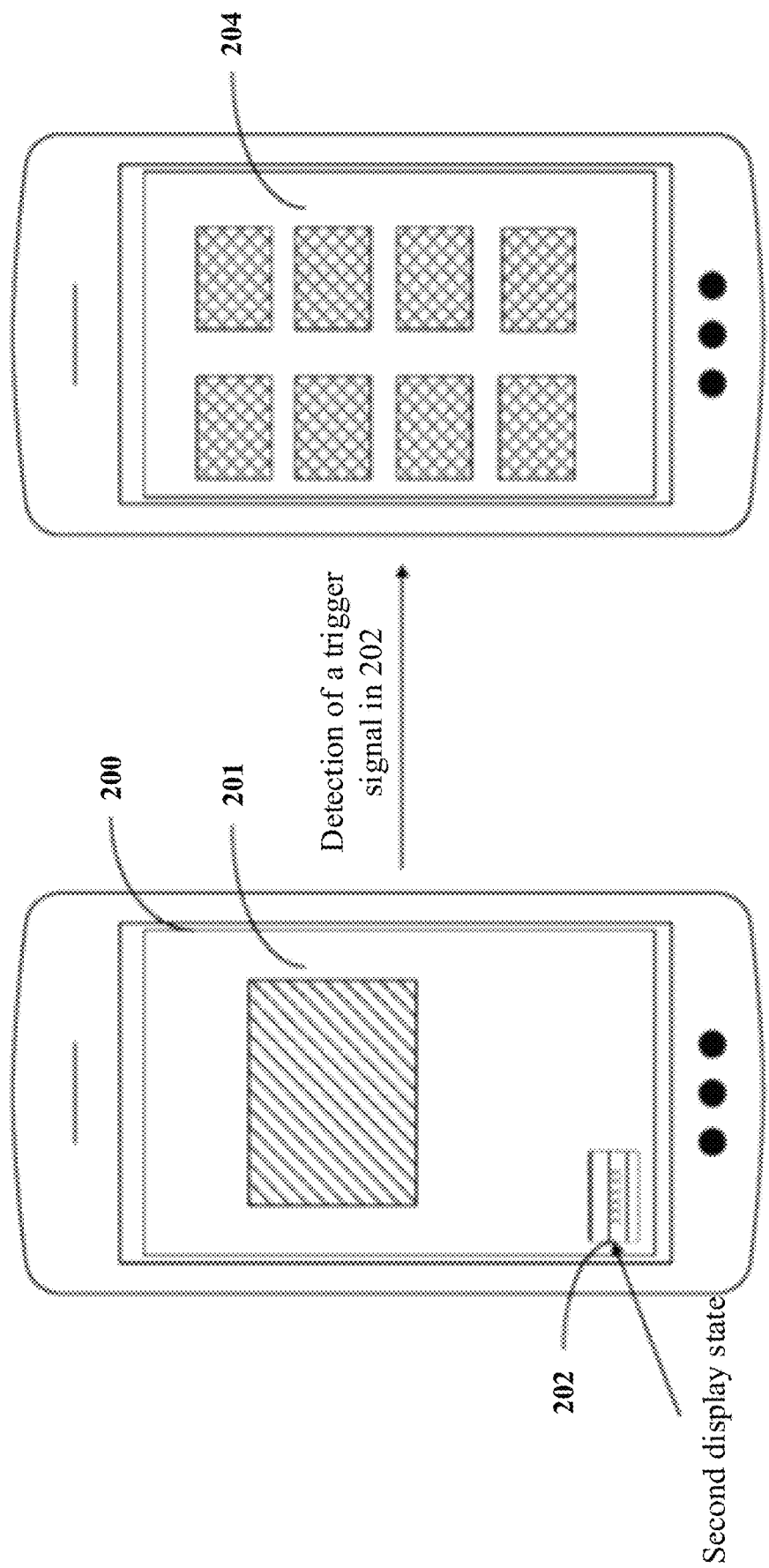

The third content may be a default display content or the latest non-real-time content. When the third content is a video list, the video list includes a video relevant to the first object; or the third content is the latest video relevant to the first object, such as the latest video made by a user relevant to the first object, etc. The first display region being displayed in the second display state indicates that the first object is in the second state, in which case the second content is in the unavailable state or a non-existent state. The third content is displayed in response to the detection of the trigger signal in the first display region. For example, a video list of or the latest video posted by the user corresponding to the first object is displayed directly. FIG. 2d illustrates an example of displaying a third content according to an embodiment of the present disclosure. As illustrated in FIG. 2d, the first display region is displayed in the second display state, in which case it means that the third content 204 is already in an available state or the second content 203 is in the unavailable state. When the trigger signal, e.g., a signal generated by a click or a selection signal triggered by voice, etc., is detected in the first display region in this case, the third content is displayed on the terminal device. The third content may be displayed on the first page 200 or on another page presented by a jump. For example, the first display region is relevant to a live-streaming parameter of the first live streamer. When the first live streamer has not started the live stream, the live-streaming parameter is in the second state, indicating that the first live streamer has not started the live stream. Therefore, the first display region is in the second display state to prompt the user watching the first content that the first live streamer has not started a live stream. When the user clicks on the first display region, the trigger signal is generated. Therefore, a video list of the first live streamer is displayed, and the user can select a video to watch from the video list.

In some embodiments, the first display region includes a first identifier or a second identifier. The first identifier corresponds to the first display state. The second identifier corresponds to the second display state. The first identifier and the second identifier are the content displayed in the first display region or the first display region itself. When the first identifier and the second identifier are the content displayed in the first display region, a style of the first identifier corresponds to the first display state, and a style of the second identifier corresponds to the second display state. That is, when the first identifier is displayed in the first display region, it means that the first object is in the first state; and when the second identifier is displayed in the first display region, it means that the first object is in the second state.

In the above embodiments, the first identifier and the second identifier are configured to indicate different jump components; or the first identifier and the second identifier are configured to indicate a same jump component, in which the first identifier is configured to indicate a first jump state of the jump component, and the second identifier is configured to indicate a second jump state of the jump component. In this embodiment, the first identifier and the second identifier indicate jump components. In an embodiment, the first identifier and the second identifier indicate different jump components, respectively. The jump component indicated by the first identifier is configured to jump to the second content, and the jump component indicated by the second identifier is configured to jump to the third content. When the state of the first object is changed, the first identifier or the second identifier is selected correspondingly for display. In this embodiment, the first identifier and the second identifier are configured to indicate the same jump component, in which the first identifier is configured to indicate the first jump state of the jump component, and the second identifier is configured to indicate the second jump state of the jump component. For example, the first jump state indicates that a jump address of the jump component is a first address, and the second jump state indicates that a jump address of the jump component is a second address. The first address corresponds to the second content, and the second address corresponds to the third content. In this embodiment, when the state of the first object is changed, the jump address of the jump component is replaced and the corresponding jump state, i.e., the first identifier or the second identifier, is displayed.

In the above embodiments, the operation of displaying the first display region in the first display state includes: displaying, in response to detection of an indication signal indicating that the first object is in the first state, the first display region in the first display state. The first display region is relevant to the first object. In some embodiments, when the first object is in the first state, the first object transmits a first indication signal to an execution device of the content display method. After the first indication signal is detected, the execution device sets the first display state as the display state of the first display region. Or, in some embodiments, when displaying the first display region, the execution device of the content display method queries the state of the first object. When the first indication signal indicating that the first object is in the first state is queried, the first display region is set in the first display state, after which the execution device may query the state of the first object at regular intervals to determine the display state of the first display region.

In the above embodiments, the operation of displaying the first display region in the second display state includes: displaying, in response to detection of an indication signal indicating that the first object is in the second state, the first display region in the second display state. The first display region is relevant to the first object. In some embodiments, when the first object is in the second state, the first object transmits a second indication signal to the execution device of the content display method. After the second indication signal is detected, the execution device sets the second display state as the display state of the first display region. Or, in some embodiments, when displaying the first display region, the execution device of the content display method queries the state of the first object. When the second indication signal indicating that the first object is in the second state is queried, the first display region is set in the second display state, after which the execution device may query the state of the first object at regular intervals to determine the display state of the first display region.

In the above embodiments, the operation of displaying the first display region in the second display state includes: displaying, in response to no detection of the indication signal indicating that the first object is in the first state, the first display region in the second display state. The first display region is relevant to the first object. In some embodiments, when the first object is in the second state, the first object transmits no first indication signal to the execution device of the content display method. The execution device detects no first indication signal and sets the second display state as the display state of the first display region. Or, in some embodiments, when displaying the first display region, the execution device of the display method queries the state of the first object, and sets, in response to failing to query any first indication signal indicating that the first object is in the first state, the first display region in the second display state, after which the execution device may query the state of the first object at regular intervals to determine the display state of the first display region. In this embodiment, the second display state is a default display state of the first display region. The first display region remains on display in the second display state as long as the first object is not in the first state.

In some embodiments, the content display method further includes: displaying, in response to a completion of displaying the second content, the first content and the first display region. That is, after the completion of displaying the second content, the first content and the first display region that were displayed before the second content was displayed continue to be displayed. The completion of displaying the second content includes one or more of elapse of a time threshold for displaying the second content, a detection of the trigger signal to close the second content, or termination of the second content.

Figure 3:
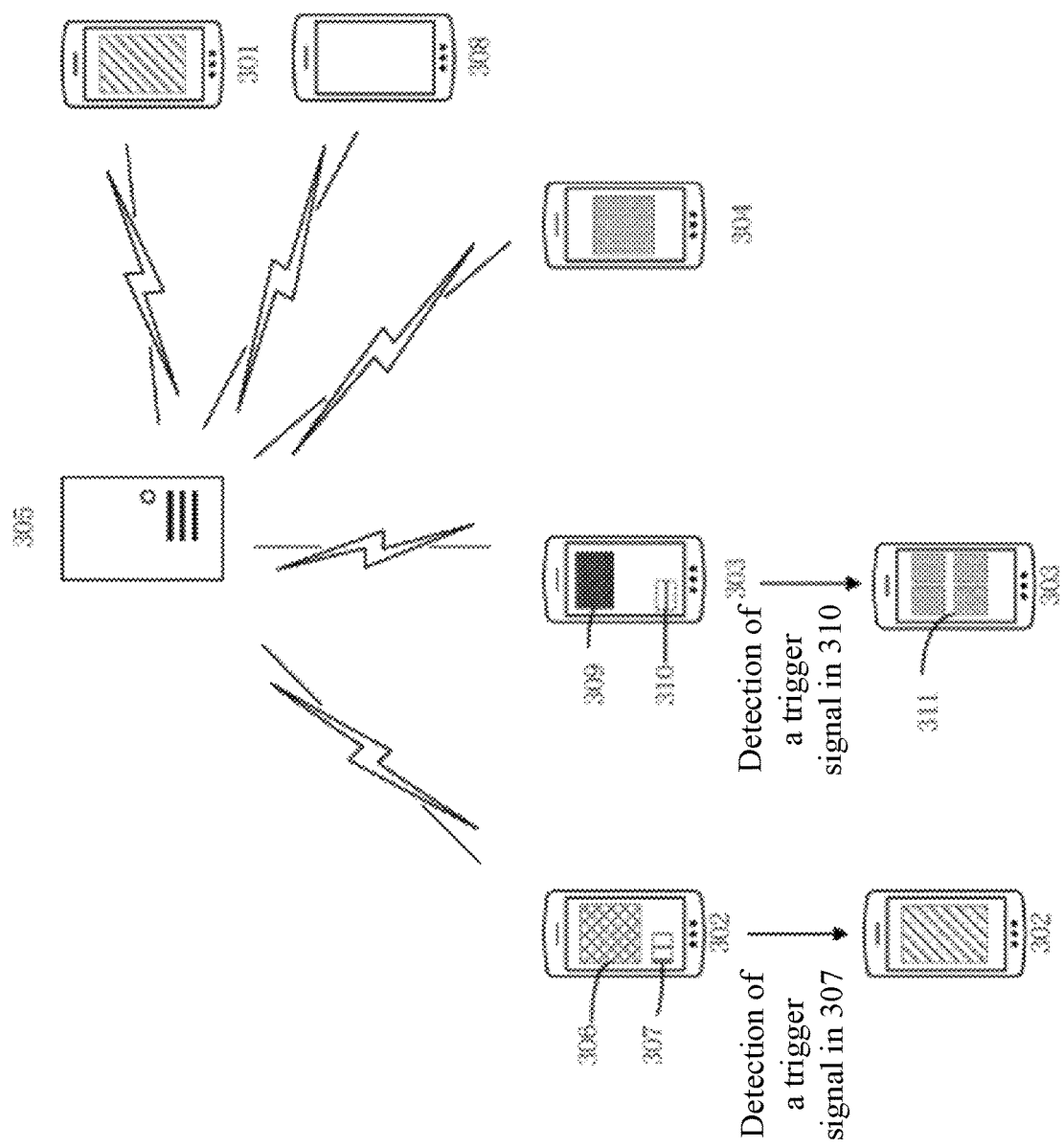
FIG. 3 is a schematic diagram showing an application scenario of a content display method according to an embodiment of the present disclosure.

FIG. 3 is a schematic diagram showing an application scenario according to an embodiment of the present disclosure. As illustrated in FIG. 3, in this application scenario, a plurality of terminal devices 301 to 304 and a live-streaming server 305 are provided. The plurality of terminal devices interact data with the server via a wired or wireless link. As illustrated in FIG. 3, different contents are displayed in the terminal devices 302 to 304. When the terminal device 301 starts a live stream, its live-streaming parameter in the server is set to live stream on air, in which case the terminal device 302 is displaying a video 306 and a jump component 307.

Since the live-streaming parameter is set to live stream on air, the jump component 307 is set in the first display state accordingly, indicating that a live streamer corresponding to the jump component 307 has started live streaming. In this case, when a user of the terminal device 302 clicks on the jump component 307, the terminal device 302 starts to display a live-streaming video stream of the terminal device 301. The terminal device 303 displays another content 309 and another jump component 310. The jump component 310 is relevant to a live-streaming parameter of a live streamer of the terminal device 308. When the terminal device 308 is not on live streaming, the jump component 310 is in the second state. In this case, when a user of the terminal device 303 clicks on the jump component 310, the terminal device 303 starts to display a video list 311 of a user of the terminal device 308. A specific implementation of the jump component may be in a form of "@user nickname". When a user indicated by "user nickname" is not live streaming, "@user nickname" does not change and only text is displayed. When the user indicated by "user nickname" is live streaming, "@user nickname" is presented in a dynamic effect to prompt the user who sees the jump component that the user indicated by "user nickname" is live streaming.

With the above content display method, the first display region relevant to the first object is displayed simultaneously with the content displayed. The state of the first object is indicated by the display state of the first display region. The first content or the second content relevant to the first object can be displayed by triggering the first display region. Therefore, a cumbersome process of searching for the first content or the second content when the user wants to watch the first content or the second content is simplified, and resources are saved.

According to the embodiments of the present disclosure, the content display method and apparatus, the electronic device, and the computer-readable storage medium are disclosed. The content display method includes: displaying the first content and the first display region, in which the first display region has the first display state and the second display state, the first display state corresponding to the first state of the first object, and the second display state corresponding to the second state of the first object; and displaying, in response to the detection of the trigger signal in the first display region, the second content relevant to the first object when the first display region is displayed in the first display state. With the above method, the state of the first object is prompted by means of the display state of the first display region and the content relevant to the first object is directly reached through the first display region, which solve a problem of resource waste resulted from displaying the content relevant to the first object.

In the above description, although the steps in the above method embodiments are described in the above sequence, it should be clear to those skilled in the art that the steps in the embodiments of the present disclosure are not necessarily performed in the above sequence. Instead, they can also be performed in other sequences such as a reverse sequence, a parallel sequence, an interleaved sequence, etc. Moreover, on the basis of the above steps, those skilled in the art can also add other steps. These obvious variants or equivalent replacements shall also fall within the protection scope of the present disclosure, and thus details thereof will be omitted here.

Figure 4:
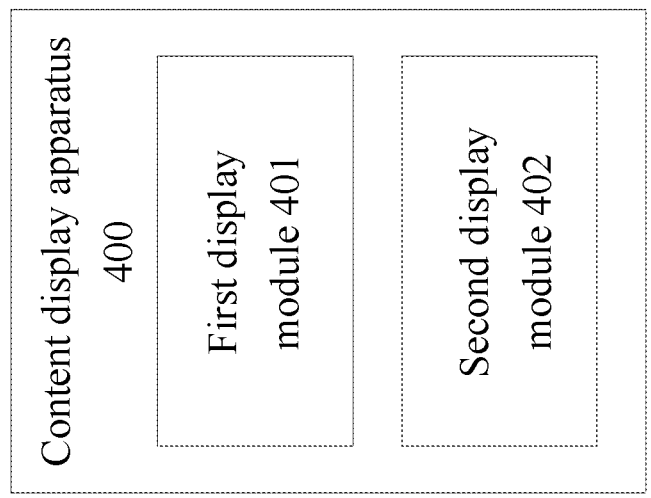
FIG. 4 is a block diagram showing a structure of a content display apparatus according to an embodiment of the present disclosure.

FIG. 4 is a block diagram showing a structure of a content display apparatus embodiment according to an embodiment of the present disclosure. As illustrated in FIG. 4, a content display apparatus 400 includes a first display module 401 and a second display module 402.

The first display module 401 is configured to display a first content and a first display region. The first display region has a first display state and a second display state. The first display state corresponds to a first state of a first object. The second display state corresponds to a second state of the first object.

The second display module 402 is configured to display, in response to detection of a trigger signal in the first display region, a second content relevant to the first object when the first display region is displayed in the first display state.

Further, the content display apparatus 400 is further configured to display, in response to the detection of the trigger signal in the first display region, a third content relevant to the first object when the first display region is displayed in the second display state.

Further, the first display region includes a first identifier or a second identifier. The first identifier corresponds to the first display state. The second identifier corresponds to the second display state.

Further, the first identifier and the second identifier are configured to indicate different jump components; or the first identifier and the second identifier are configured to indicate a same jump component, the first identifier being configured to indicate a first jump state of the jump component, and the second identifier being configured to indicate a second jump state of the jump component.

Further, the content display apparatus 400 is further configured to display, in response to detection of an indication signal indicating that the first object is in the first state, the first display region in the first display state.

Further, the content display apparatus 400 is further configured to display, in response to detection an indication signal indicating that the first object is in the second state, the first display region in the second display state.

Further, the content display apparatus 400 is further configured to display, in response to no detection of the indication signal indicating that the first object is in the first state, the first display region in the second display state.

Further, the first state of the first object corresponds to a state in which the second content is in an available state; and the second state of the first object corresponds to a state in which the second content is in an unavailable state.

Further, the content display apparatus 400 is further configured to display, in response to a completion of displaying the second content, the first content and the first display region.

Further, the second content is a real-time content relevant to the first object.

The apparatus illustrated in FIG. 4 may perform the method according to the embodiments illustrated in FIG. 1 to FIG. 2d. Reference to parts not described in detail in this embodiment can be made to the relevant description of the embodiments illustrated in FIG. 1 to FIG. 2d. For execution processes and technical effects of this technical solution, reference may be made to description of the embodiments illustrated in FIG. 1 to FIG. 2d, and thus details thereof will be omitted here.

Figure 5:
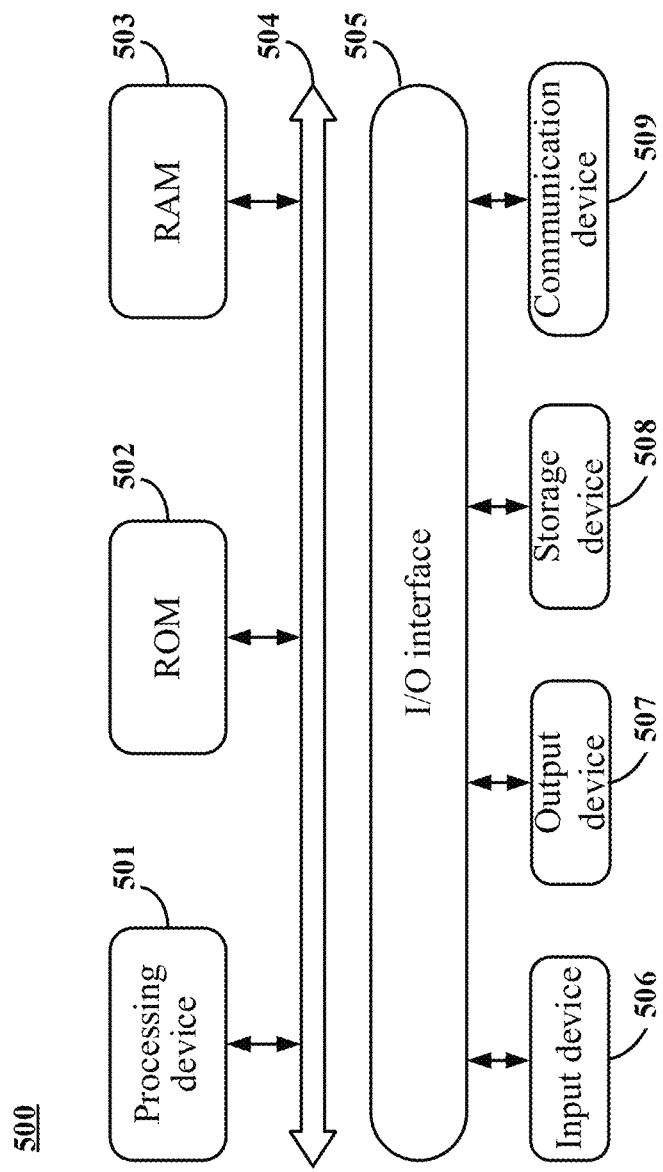
FIG. 5 is a block diagram showing a structure of an electronic device according to an embodiment of the present disclosure.

Reference is now made to FIG. 5, which is a schematic diagram showing a structure of an electronic device 500 adapted to implement the embodiments of the present disclosure. The terminal device according to the embodiments of the present disclosure may include, but not limited to, a mobile terminal such as a mobile phone, a laptop computer, a digital broadcast receiver, a PDA (Personal Digital Assistant), a PAD (Portable Android Device), a PMP (Portable Multimedia Player), or a vehicle-mounted terminal (e.g., a vehicle-mounted navigation terminal), or a fixed terminal such as a digital TV, a desktop computer, etc. The electronic device illustrated in FIG. 5 is exemplary only, and should not be construed as limiting the function and scope of use of the embodiments of the present disclosure.

As illustrated in FIG. 5, the electronic device 500 may include a processing device (such as a central processing unit, a graphics processing unit, etc.) 501, which may perform various appropriate actions and processes in accordance with programs stored in a Read-Only Memory (ROM) 502 or loaded from a storage device 508 into a Random Access Memory (RAM) 503. In the RAM 503, various programs and data required for the operation of the electronic device 500 may also be stored. The processing device 501, the ROM 502, and the RAM 503 are connected to each other through a bus 504. An Input/Output (I/O) interface 505 is also connected to the bus 504.

Generally, connected to the I/O interface 505 may include: an input device 506 including, for example, a touch screen, a touch pad, a keyboard, a mouse, a camera, a microphone, an accelerometer, a gyroscope, etc.; an output device 507 including, for example, a Liquid Crystal Display (LCD), a speaker, an oscillator, etc.; the storage device 508 including, for example, a magnetic tape or a hard disk; and a communication device 509. The communication device 509 may allow the electronic device 500 to perform wireless or wired communication with other devices for data exchange. Although FIG. 5 illustrates the electronic device 500 having various devices, it can be appreciated that it is not necessary to implement or provide all the illustrated devices. Alternatively, more or fewer devices may be implemented or provided.

In particular, according to the embodiments of the present disclosure, the processes described above with reference to the flowcharts may be implemented as computer software programs. For example, an embodiment of the present disclosure includes a computer program product, which includes a computer program carried on a non-transitory computer-readable medium. The computer program includes program codes for implementing the method illustrated in the flowchart. In these embodiments, the computer program may be downloaded and installed from a network through the communication device 509, or installed from the storage device 508, or installed from the ROM 502. When the computer program is executed by the processing device 501, the above-mentioned functions defined in the methods according to the embodiments of the present disclosure are performed.

It should be noted that in the present disclosure, the above-mentioned computer-readable medium may be a computer-readable signal medium, a computer-readable storage medium, or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a RAM, a ROM (Read-Only Memory), an Electrical Programmable Read-Only Memory (EPROM) or a flash memory, an optical fiber, a Compact Disc ROM (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including, but not limited to, an electromagnetic signal, an optical signal, or any suitable combination thereof. The computer-readable signal medium may also be any computer-readable medium other than the computer-readable storage medium, which may transmit, propagate, or transfer programs used by or used with an instruction execution system, apparatus or device. The program codes contained on the computer-readable medium may be transmitted via any appropriate medium, including but not limited to an electric cable, an optical cable, a Radio Frequency (RF), or any suitable combination thereof.

In some embodiments, the client and the server may communicate using any currently-known or future-developed network protocol, such as HTTP (HyperText Transfer Protocol), and may be in communication interconnection with digital data in any form or medium (e.g., a communication network). Examples of the communication network include a Local Area Network ("LAN"), a Wide Area Network ("WAN"), an Internet work (e.g., the Internet), and an end-to-end network (e.g., ad hoc end-to-end network), as well as any currently-known or future-developed network.

The above computer-readable medium may be included in the above electronic device; or may be standalone without being assembled into the electronic device.

The above computer-readable medium may carry one or more programs which, when executed by the electronic device, cause the terminal device to perform the method according to any of the above embodiments.

The computer program codes for implementing the operations of the present disclosure may be written in one or more programming languages or any combination thereof. The programming languages may include, but not limited to, object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the drawings illustrate architectures, functions, and operations of possible implementations of systems, methods and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the drawings. For example, two blocks illustrated in succession may actually be executed substantially in parallel with each other, or sometimes even in a reverse order, depending on the involved functions. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Units involved and described in the embodiments of the present disclosure may be implemented in software or hardware. Here, a name of a unit does not constitute a limitation on the unit itself under certain circumstances.

The functions described above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium would include an electrical connection having one or more wires, a portable computer disk, a hard disk, a Random Access Memory (RAM), a Read-Only Memory (ROM), an Electrical Programmable Read-Only Memory (EPROM), an optical fiber, a Compact Disc ROM (CD-ROM), an optical memory device, a magnetic memory device, or any suitable combination thereof.

According to one or more embodiments of the present disclosure, a content display method is provided according to embodiments of the present disclosure. The content display method includes: displaying a first content and a first display region, in which the first display region has a first display state and a second display state, the first display state corresponding to a first state of a first object, and the second display state corresponding to a second state of the first object; and displaying, in response to detection of a trigger signal in the first display region, a second content relevant to the first object when the first display region is displayed in the first display state.

Further, the content display method further includes displaying, in response to the detection of the trigger signal in the first display region, a third content relevant to the first object when the first display region is displayed in the second display state.

Further, the first display region includes: a first identifier corresponding to the first display state; or a second identifier corresponding to the second display state.

Further, the first identifier and the second identifier are configured to indicate different jump components; or the first identifier and the second identifier are configured to indicate a same jump component, the first identifier being configured to indicate a first jump state of the jump component, and the second identifier being configured to indicate a second jump state of the jump component.

Further, the displaying the first display region in the first display state includes: displaying, in response to detection of an indication signal indicating that the first object is in the first state, the first display region in the first display state.

Further, the displaying the first display region in the second display state includes displaying, in response to detection of an indication signal indicating that the first object is in the second state, the first display region in the second display state.

Further, the displaying the first display region in the second display state includes displaying, in response to no detection of the indication signal indicating that the first object is in the first state, the first display region in the second display state.

Further, the first state of the first object corresponds to a state in which the second content is in an available state, and the second state of the first object corresponds to a state in which the second content is in an unavailable state.

Further, the content display method further includes displaying the first content and the first display region in response to a completion of displaying the second content.

Further, the second content is a real-time content relevant to the first object.

According to one or more embodiments of the present disclosure, a content display apparatus is provided. The content display apparatus includes: a first display module configured to display a first content and a first display region, in which the first display region has a first display state and a second display state, the first display state corresponding to a first state of a first object, and the second display state corresponding to a second state of the first object; and a second display module configured to display, in response to detection of a trigger signal in the first display region, a second content relevant to the first object when the first display region is displayed in the first display state.

Further, the content display apparatus is further configured to display, in response to the detection of the trigger signal in the first display region, a third content relevant to the first object when the first display region is displayed in the second display state.

Further, the first display region includes: a first identifier corresponding to the first display state; or a second identifier corresponding to the second display state.

Further, the first identifier and the second identifier are configured to indicate different jump components; or the first identifier and the second identifier are configured to indicate a same jump component, the first identifier being configured to indicate a first jump state of the jump component, and the second identifier being configured to indicate a second jump state of the jump component.

Further, the content display apparatus is further configured to display, in response to detection of an indication signal indicating that the first object is in the first state, the first display region in the first display state.

Further, the content display apparatus is further configured to: display, in response to detection of an indication signal indicating that the first object is in the second state, the first display region in the second display state.

Further, the content display apparatus is further configured to display, in response to no detection of the indication signal indicating that the first object is in the first state, the first display region in the second display state.

Further, the first state of the first object corresponds to a state in which the second content is in an available state, and the second state of the first object corresponds to a state in which the second content is in an unavailable state.

Further, the content display apparatus is further configured to display the first content and the first display region in response to a completion of displaying the second content.

Further, the second content is a real-time content relevant to the first object.

According to one or more embodiments of the present disclosure, an electronic device is provided. The electronic device includes: at least one processor; and a memory in a communication connection with the at least one processor. The memory is configured to store instructions executable by the at least one processor. The instructions are executed by the at least one processor to cause the at least one processor to perform the content display method described in any implementation of the above first aspect.

According to one or more embodiments of the present disclosure, a non-transitory computer-readable storage medium is provided. The non-transitory computer-readable storage medium is configured to store computer instructions. The computer instructions are configured to cause a computer to perform the content display method described in any implementation of the above first aspect.

The above description is only intended to explain the preferred embodiments of the present disclosure and the employed principles of technology. It will be appreciated by those skilled in the art that the scope of the present disclosure herein is not limited to the technical solutions formed by the specific combinations of the above technical features, and should also encompass other technical solutions formed by any other combinations of features described above or equivalents thereof without departing from the above concepts of the present disclosure. For example, the above features and the technical features disclosed in the present disclosure having similar functions (but not limited thereto) are replaced with each other to form the technical solution.

What is claimed is:

1. A content display method, comprising:
   displaying a first interface,
   displaying a first content in the first interface, the first interface comprising a first display region, the first content being relevant to a first object, wherein the first display region is displayed in a first display state when the first object is in a first state; and
   displaying, in response to a trigger signal in the first display region, a second content relevant to the first object when the first display region is displayed in the first display state,
   wherein the first display region comprises a first display sub-region and a second display sub-region, the first display sub-region being configured to display association information between the first content and the first object, the second display sub-region being configured to display an identification of the first object, and
   wherein said displaying, in response to the trigger signal in the first display region, the second content relevant to the first object when the first display region is displayed in the first display state comprises: displaying, in response to the trigger signal in the second display sub-region, the second content relevant to the first object when the first display region is displayed in the first display state.

2. The content display method according to claim 1, wherein the first display region is display in a second display state when the first object is in a second state, and the method further comprises:
   displaying, in response to the trigger signal in the first display region, a third content relevant to the first object when the first display region is displayed in the second display state.

3. The content display method according to claim 2, wherein the first display region comprises:
   a first identifier corresponding to the first display state; or
   a second identifier corresponding to the second display state.

4. The content display method according to claim 3, wherein:
the first identifier and the second identifier are configured to indicate different jump components; or
the first identifier and the second identifier are configured to indicate a same jump component, the first identifier being configured to indicate a first jump state of the jump component, and the second identifier being configured to indicate a second jump state of the jump component.

5. The content display method according to claim 1, wherein said displaying the first display region in the first display state comprises:
displaying, in response to an indication signal indicating that the first object is in the first state, the first display region in the first display state.

6. The content display method according to claim 2, wherein said displaying the first display region in the second display state comprises:
displaying, in response to an indication signal indicating that the first object is in the second state, the first display region in the second display state.

7. The content display method according to claim 2, wherein said displaying the first display region in the second display state comprises:
displaying, in response to no an indication signal indicating that the first object is in the first state, the first display region in the second display state.

8. The content display method according to claim 2, wherein:
the first state of the first object corresponds to a state in which the second content is in an available state; and
the second state of the first object corresponds to a state in which the second content is in an unavailable state.

9. The content display method according to claim 1, further comprising:
displaying the first content and the first display region in response to a completion of displaying the second content.

10. The content display method according to claim 1, wherein the second content is a real-time content relevant to the first object.

11. An electronic device, comprising:
a memory configured to store computer-readable instructions; and
a processor configured to execute the computer-readable instructions, wherein the processor, when executing the computer-readable instructions, causes the electronic device to:
display a first interface,
display a first content in the first interface, the first interface comprising a first display region, the first content being relevant to a first object, wherein the first display region is displayed in a first display state when the first object is in a first state; and
display, in response to a trigger signal in the first display region, a second content relevant to the first object when the first display region is displayed in the first display state,
wherein the first display region comprises a first display sub-region and a second display sub-region, the first display sub-region being configured to display association information between the first content and the first object, the second display sub-region being configured to display an identification of the first object, and
wherein displaying, in response to the trigger signal in the first display region, the second content relevant to the first object when the first display region is displayed in the first display state comprises: displaying, in response to the trigger signal in the second display sub-region, the second content relevant to the first object when the first display region is displayed in the first display state.

12. The electronic device according to claim 11, wherein the first display region is display in a second display state when the first object is in a second state, and wherein the processor, when executing the computer-readable instructions, further causes the electronic device to:
display, in response to the trigger signal in the first display region, a third content relevant to the first object when the first display region is displayed in the second display state.

13. The electronic device according to claim 12, wherein the first display region comprises:
a first identifier corresponding to the first display state; or
a second identifier corresponding to the second display state.

14. The electronic device according to claim 13, wherein:
the first identifier and the second identifier are configured to indicate different jump components; or
the first identifier and the second identifier are configured to indicate a same jump component, the first identifier being configured to indicate a first jump state of the jump component, and the second identifier being configured to indicate a second jump state of the jump component.

15. The electronic device according to claim 11, wherein said displaying the first display region in the first display state comprises:
displaying, in response to an indication signal indicating that the first object is in the first state, the first display region in the first display state.

16. The electronic device according to claim 12, wherein said displaying the first display region in the second display state comprises:
displaying, in response to an indication signal indicating that the first object is in the second state, the first display region in the second display state.

17. The electronic device according to claim 12, wherein said displaying the first display region in the second display state comprises:
displaying, in response to no an indication signal indicating that the first object is in the first state, the first display region in the second display state.

18. The electronic device according to claim 12, wherein:
the first state of the first object corresponds to a state in which the second content is in an available state; and
the second state of the first object corresponds to a state in which the second content is in an unavailable state.

19. The electronic device according to claim 11, wherein the processor, when executing the computer-readable instructions, further causes the electronic device to:
display the first content and the first display region in response to a completion of displaying the second content.

20. A non-transitory computer-readable storage medium, having computer-readable instructions stored thereon, wherein the computer-readable instructions, when executed by a computer, cause the computer to:
display a first interface,
display a first content in the first interface, the first interface comprising a first display region, the first content being relevant to a first object, wherein the first display region is displayed in a first display state when the first object is in a first state; and display, in response to a trigger signal in the first display region, a second content relevant to the first object when the first display region is displayed in the first display state, wherein the first display region comprises a first display sub-region and a second display sub-region, the first display sub-region being configured to display association information between the first content and the first object, the second display sub-region being configured to display an identification of the first object, and wherein displaying, in response to the trigger signal in the first display region, the second content relevant to the first object when the first display region is displayed in the first display state comprises: displaying, in response to the trigger signal in the second display sub-region, the second content relevant to the first object when the first display region is displayed in the first display state.

* * * * *